US008295583B2

(12) United States Patent
Dahari

(10) Patent No.: US 8,295,583 B2
(45) Date of Patent: Oct. 23, 2012

(54) SYSTEM AND METHOD FOR AUTOMATIC RECOGNITION OF UNDETECTED ASSETS

(75) Inventor: Ronen Dahari, Be'er Yaacov (IL)

(73) Assignee: Metaform Ltd., Givat Shmuel (IL)

( * ) Notice: Subject to any disclaimer, the term of this patent is extended or adjusted under 35 U.S.C. 154(b) by 690 days.

(21) Appl. No.: 12/509,793

(22) Filed: Jul. 27, 2009

(65) Prior Publication Data

US 2010/0027894 A1    Feb. 4, 2010

Related U.S. Application Data

(60) Provisional application No. 61/129,938, filed on Jul. 31, 2008.

(51) Int. Cl.
*G06K 9/00* (2006.01)

(52) U.S. Cl. ......... 382/143; 382/103; 382/173; 345/419

(58) Field of Classification Search ..................... None
See application file for complete search history.

(56) References Cited

U.S. PATENT DOCUMENTS

| | | | |
|---|---|---|---|
| 4,844,509 A | 7/1989 | Kasprzak et al. | |
| 6,286,656 B1 | 9/2001 | Huang et al. | |
| 6,678,395 B2 * | 1/2004 | Yonover et al. | ............... 382/103 |
| 6,801,245 B2 | 10/2004 | Shniberg et al. | |
| 7,104,453 B1 | 9/2006 | Zhu et al. | |
| 7,185,812 B2 | 3/2007 | Wong et al. | |
| 2002/0040767 A1 | 4/2002 | Yang | |
| 2003/0034397 A1 | 2/2003 | Patton | |
| 2005/0098632 A1 | 5/2005 | Turvy, Jr. et al. | |
| 2007/0202811 A1 * | 8/2007 | Chanowitz | ................. 455/67.12 |

* cited by examiner

*Primary Examiner* — Luna Champagne
(74) *Attorney, Agent, or Firm* — Oliff & Berridge, PLC

(57) ABSTRACT

In logistic scenarios where multiple assets are stacked to form a package of assets, it is often important to determine the number and types of assets which are stacked together. Various systems and methods of determining the content of a package of assets are known in the art, however, there are cases in which they fail to detect one or more assets and also fail to provide any indication that an asset has been overlooked or is missing. According to one aspect of the present invention there is provided a system and method that enable to automatically detect one or more assets in a package which are missing. According to another aspect of the present invention there is provided a system and method for detecting the number of missing assets and also specific characteristics of each of one or more missing assets.

22 Claims, 7 Drawing Sheets

SYSTEM AND METHOD FOR AUTOMATIC RECOGNITION OF UNDETECTED ASSETS

FIELD OF THE INVENTION

This present invention relates to identification of assets.

BACKGROUND OF THE INVENTION

There has been significant interest in assets detection by barcodes, pattern recognition, RFID as well as many other methods.

U.S. Pat. No. 6,801,245 entitled "Method for automatic identification and data capture" discloses a methodology for tracking objects includes receiving a multiplicity of objects to be tracked at a known location. Each multiplicity of objects has at least one imagable identifier affixed to it. The method also includes imaging the multiplicity of objects together at the known location to provide at least a partial image of the multiplicity of objects. The method also includes employing the partial image to determine an identification code for a plurality of the multiplicity of objects, as well as associating each identification code with a known location code.

U.S. Pat. No. 7,185,812 entitled "Packaging inspection and verification system and method" describes a packaging inspection and verification system and method which are applied to products to be packaged. An identification device reads type barcodes of the products and labels affixed to packing boxes for receiving product accessories. A processing unit obtains from a database barcodes of the accessories according to the type barcodes, and determines consistency between the labels affixed to the packing boxes. The barcodes of the accessories, if not consistent, generate a signal indicating an error occurring in the product accessories. The identification device reads ID codes of the products and labels affixed to cartons for receiving the products. The processing unit obtains from another database barcodes of the products according to the ID codes, and determines consistency between the labels affixed to the cartons, and the barcodes of the products, if not consistent, generate a signal indicating an error occurring in the labels affixed to the cartons.

US 2005098632 entitled "Method of reading a plurality of bar codes during a scanning motion" describes a method of reading a plurality of bar codes during a scanning motion across a bar code scanner which enhances scanner operation. The method includes the steps of obtaining data from a detector in the bar code scanner, determining position information associated with the data, distinguishing data associated with each bar code using the position information, and assembling the bar codes from the data.

US 2003034397 entitled "Missing link-part detector employing bar code reader" describes a bar code reader missing link detection system for detection of missing, defective or misaligned chain links in assembled or in-process chains, and includes a light source for illuminating one or more chain links of a chain, a light sensitive diode array for detecting an image of a fixed scan line, produced by the light source, and a lens system for focusing incoming light produced by the light source onto the diode array, wherein the system is arranged such that the bar code reader reflects light from one or more of the chain links onto the diode array, and the diode array is continuously scanned, digitized, and the data obtained thereby interpreted to detect missing chain links.

US 2002040767 entitled "Labeling machine capable of detection of defective products and removal of the defective products at a take-out end of a conveying unit thereof" discloses a labeling machine, a bar code sensor, a batch information sensor and a label sensor which are coupled electrically to a controller, and are disposed along an advancing route of a label reel. When any of these sensors detects an error in one of the labels or the absence of a label on the reel, the controller activates a container removal unit to remove the container with the defective label or with no label at a take-out end of a container conveying unit.

U.S. Pat. No. 6,286,656 entitled "Apparatus for measuring length of accumulated packages" describes a method and apparatus for palletizing rectangular packages received in random size and weight. A "corner"-based modeling system is used to assist in evaluating possible placements of packages accumulated on a line conveyor, and a placement evaluation process is used to select a "best" package placement based on heuristic analysis. Statistically-based measurement and comparison is used to assist in the evaluation process.

U.S. Pat. No. 7,104,453 entitled "Unitary package identification and dimensioning system employing laser-based scanning methods" describes a fully automated package identification and measuring system (300), in which an omnidirectional holographic scanning tunnel (100) is used to read bar codes on packages entering the tunnel, while a package dimensioning subsystem (500, 600) is used to capture information about the package prior to entry into the tunnel. Mathematical models are created on a real-time basis for the geometry of the package and the position of the laser scanning beam used to read the bar code symbol thereon. The mathematical models are analyzed to determine if collected and queued package identification data is spatially and/or temporally correlated with package measurement data using vector-based ray-tracing methods, homogeneous transformations, and object-oriented decision logic so as to enable simultaneous tracking of multiple packages being transported through the scanning tunnel.

U.S. Pat. No. 4,844,509 entitled "Coding system" discloses a machine-readable, human-readable coding system comprising a one piece, pre-printed label having at least two identical messages coded on the label. The label has two columns, one column, (2) being a series of aligned segments (6). There is one data character (12) of an OCR code located in each segment. The background of each segment is color coded for human readability. A second column (8) contains a single machine-readable bar code (12) containing the same message as the OCR code. The color coded segments and the OCR code are readable in one direction and the bar code in the opposite direction.

SUMMARY OF THE INVENTION

According to a first aspect of the present invention there is provided a method for automatic recognition of one or more undetected assets from a plurality of assets, the plurality of assets forming a package and wherein one or more of the plurality of assets is associated with at least one identifier, the method comprising:

a) obtaining information indicative of an area of inspection, the area of inspection representing at least a part of the package;

b) detecting at least one identifier and determining a position of the at least one identifier in respect of the area of inspection; the position is indicative of a position of an asset being associated with the at least one identifier;

c) obtaining spatial properties of the asset;

d) obtaining a digital representation of the area of inspection, based on the position of the at least one identifier and the spatial properties of the asset being associated with the identifier;

e) detecting one or more holes in the digital representation of the area of inspection, each of the one or more holes being suspected as an area representing one or more undetected assets.

According to another aspect of the invention there is provided a method for automatic recognition of one or more undetected assets from a plurality of assets, the plurality of assets forming a package and wherein one or more of the plurality of assets is associated with at least one identifier, the method comprising:

a) obtaining a digital representation of an area of inspection, the area of inspection representing at least part of the package; wherein the digital representation is generated based on a position of the at least one identifier and on one or more spatial properties of the one or more assets;

b) detecting one or more holes in the digital representation of the area of inspection, each of the one or more holes being suspected as an area representing one or more undetected assets.

According to yet another aspect of the invention there is provided a system for automatic recognition of one or more unidentified assets from a plurality of assets, the plurality of assets forming a package and at least one of the plurality of assets is associated with at least one identifier, the system comprising:

at least one detection device, an asset detection module, and an unidentified asset locater;

the at least one detection device is configured for obtaining information indicative of an area of inspection, the area of inspection representing at least a portion of the package;

the asset detection module is associated with the at least one detection device and is configured for detecting at least one identifier within the area of inspection and determining a position of the at least one identifier in respect of the area of inspection, wherein the position is indicative of a position of an asset being associated with the at least one identifier;

the unidentified asset locater is configured to perform at least the following:

obtain spatial properties of each of the asset; obtain a digital representation of the area of inspection, based on the position of the at least one identifier and the spatial properties of the asset being associated with the at least one identifier; and detect one or more holes in the digital representation of the area of inspection, each of the one or more holes being suspected as an area representing one or more undetected assets.

BRIEF DESCRIPTION OF THE DRAWINGS

In order to understand the invention and to see how it may be carried out in practice, some embodiments will now be described, by way of non-limiting example only, with reference to the accompanying drawings, in which.

DETAILED DESCRIPTION OF EMBODIMENTS

Unless specifically stated otherwise, as apparent from the following discussions, it is appreciated that throughout the specification discussions utilizing terms such as "detecting", "decoding", "identifying", "processing", "computing", "calculating", "determining", "generating", "configuring" or the like, refer to the action and/or processes of a computer that manipulate and/or transform data into other data, said data represented as physical, e.g. such as electronic, quantities and representing the physical objects. The term "computer" should be expansively construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices and combinations thereof.

The operations in accordance with the teachings herein may be performed by a computer specially constructed for the desired purposes or by a general purpose computer specially configured for the desired purpose by a computer program stored in a computer readable storage medium.

In addition, embodiments of the present invention are not described with reference to any particular programming language. It will be appreciated that a variety of programming languages may be used to implement the teachings of the inventions as described herein.

As used herein, the phrase "for example," "such as" and variants thereof describing exemplary implementations of the present invention are exemplary in nature and not limiting. Reference in the specification to "one embodiment", "an embodiment", "some embodiments", "another embodiment", "other embodiments", "certain embodiment" or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments", "certain embodiments" or variations thereof do not necessarily refer to the same embodiment(s).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the invention will now occur to the reader.

Figure 4:
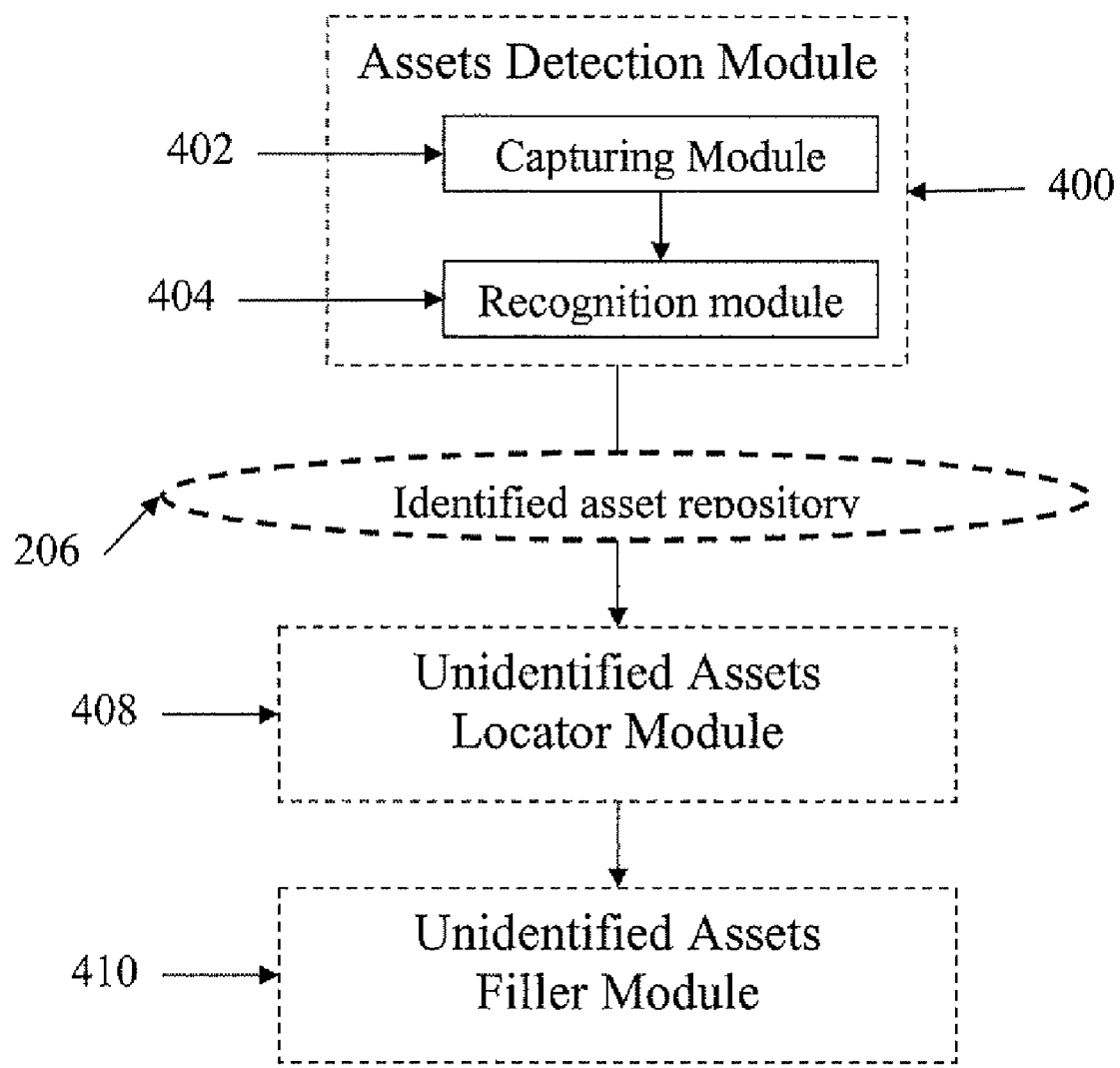
FIG. 4 is a block diagram illustrating a high level view of an assets detection system, in accordance with an embodiment of the invention.
Figure 5:
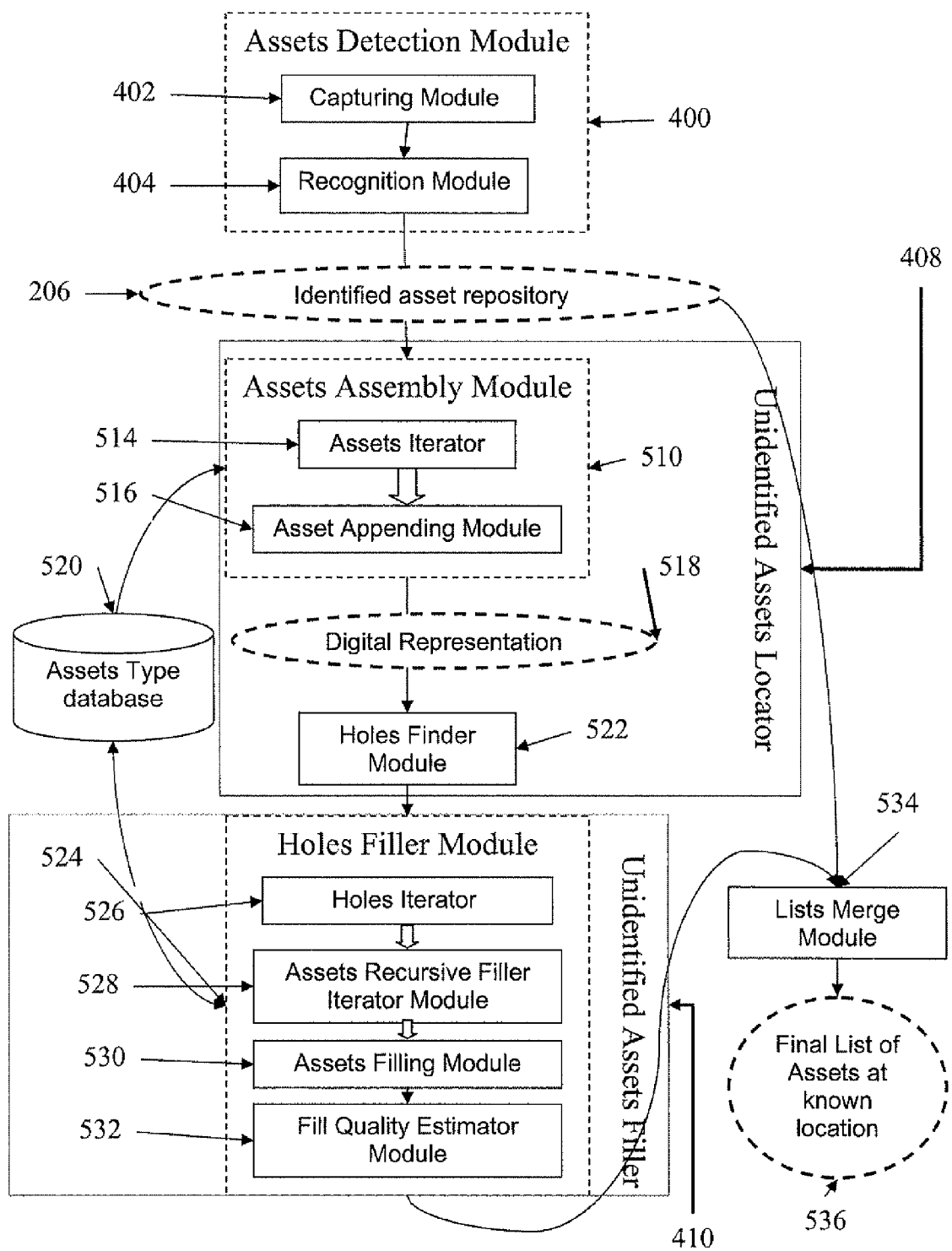
FIG. 5 is a block diagram illustrating a detailed view of an assets detection system, in accordance with an embodiment of the invention.
Figure 6:
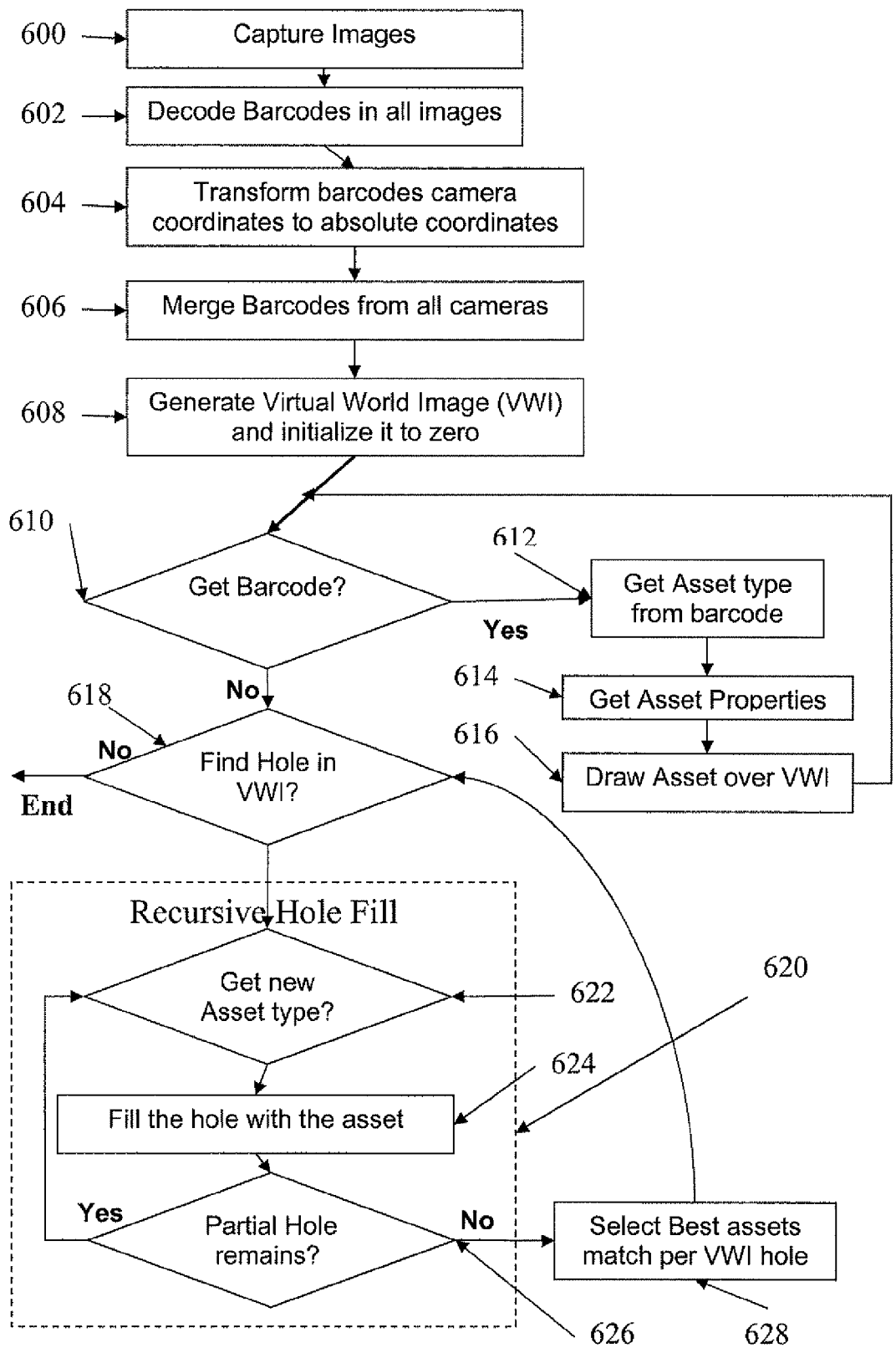
FIG. 6 is a flowchart showing the operations of an assets detection system, in accordance with an embodiment of the invention; and, FIG. 7 is an example of detection process results, in accordance with an embodiment of the invention.

In embodiments of the invention, fewer, more and/or different stages than those shown in FIG. 6 may be executed. In embodiments of the invention one or more stages illustrated in FIG. 6 may be executed in a different order and/or one or more groups of stages may be executed simultaneously. FIG. 4 and FIG. 5 show schematic illustrations of the system architecture in accordance with an embodiment of the invention.

Each module in FIG. 4 and FIG. 5 can be made up of any combination of software, hardware and/or firmware that performs the functions as defined and explained herein. The modules in FIG. 4 and FIG. 5 may be centralized in one location or dispersed over more than one location. In other embodiments of the invention, the system may comprise fewer, more, and/or different modules than those shown in FIG. 4 and FIG. 5.

Unless defined otherwise, all technical and scientific terms used herein have the same meaning as commonly understood by one of ordinary skill in the art to which this invention belongs. Generally (although not necessarily), the nomenclature used herein described below is well known and commonly employed in the art. Unless described otherwise, conventional methods are used, such as those provided in the art and various general references.

The description set forth herein includes certain examples of assets identification systems and methods, by means of detection of barcodes attached to the assets. It should be noted that barcodes serve as one non-limiting example of an identifier which may be attached to an asset. The identifier is detected by a detection system which is designated for recognizing the identifier. For example in case the identifier is a barcode, the corresponding detection system would comprise a barcode reader. Examples in the description corresponding to barcodes and barcode readers are used for the purpose of demonstration only to allow the reader to better understand the invention. The invention however, is by no means bound by these examples and alternative types of assets identifiers, such as pattern recognition, RFID, and corresponding detection means, may be used as well.

Although the embodiment of the present invention is discussed hereafter with respect to assets, it should be appreciated that "assets" is considered a general term and the present invention may be applied to any object, product or goods, for example: boxes, crates, cartons, documents, etc.

Figure 1:
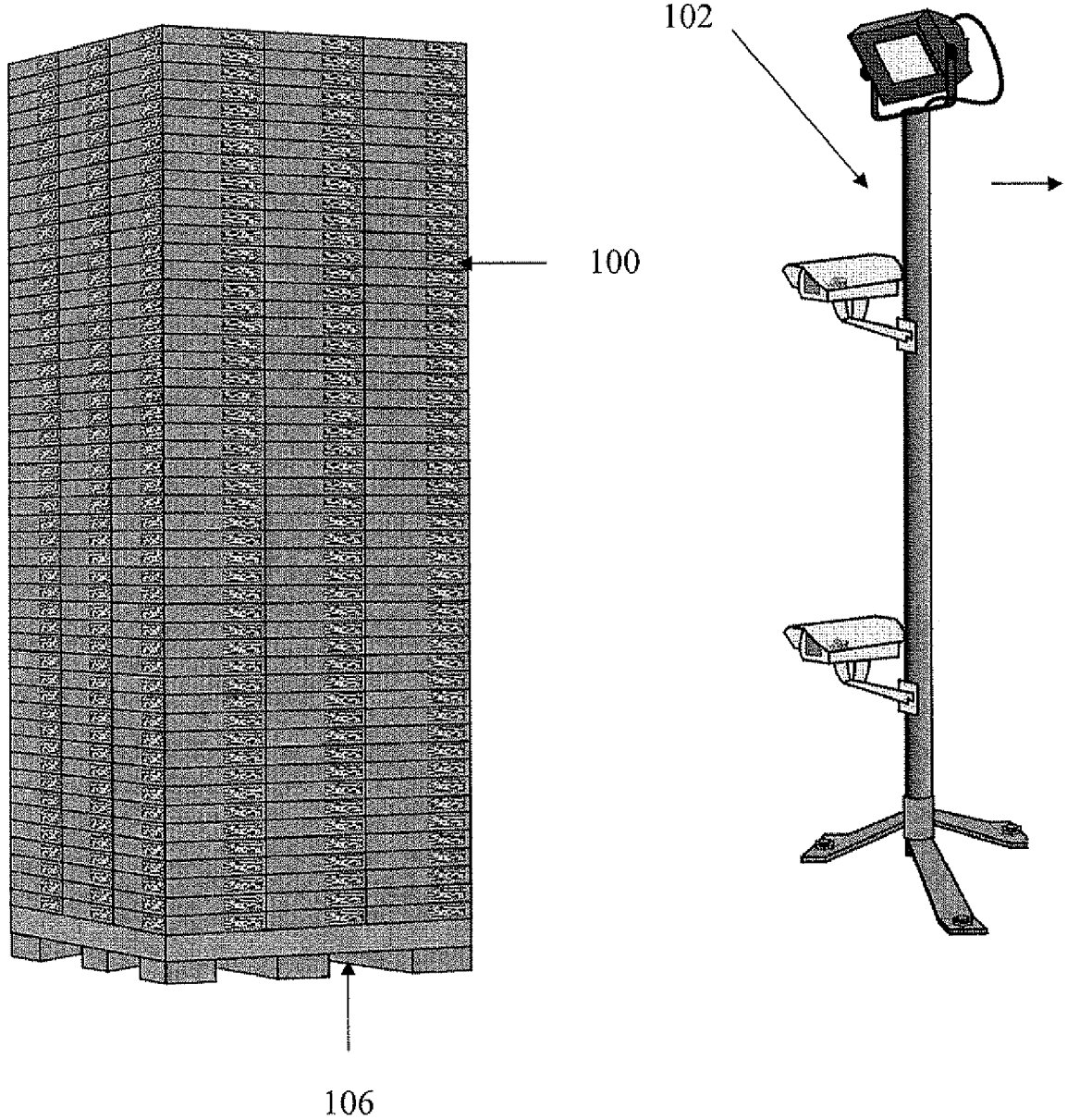
FIG. 1 is a schematic illustration of a prior art assets detection system.

Bearing the above in mind, attention is now drawn to FIG. 1 which is a schematic illustration of a prior art assets detection system. In many logistic scenarios multiple assets are stacked to form a package of assets 100. In many cases, for example, before shipping or delivery, during receiving, or before inserting into a warehouse, it is important to determine the number and types of assets which are stacked together in a given package of assets 100. Various methods of determining the content of a package of assets are known in the art, for example: manual counting, automatic systems that read identification barcodes which are attached to the assets, or reading RFID cards attached to the assets.

In FIG. 1, for example, a pallet 106 (i.e. a flat transport structure that supports goods in a stable fashion) with multiple assets (e.g. a package) 100 is placed in front of one or more barcode readers 102. Each asset may be associated with one or more identifiers. In this example each asset is identified by a barcode which is attached to the asset. A barcode reader is one example for an asset detection system wherein in some cases a system may include more than one barcode reader. When activated, the barcode readers capture images and process the images by utilizing barcode detection and decoding hardware and software. Typically, barcode detection systems comprise a barcode reader associated, via a communication link, with a computer terminal. Alternatively or additionally, a barcode reader and a computer terminal may be configured as a single unified apparatus. The barcode reader comprises a scanning or imaging device capable of reading a printed sign or indication, such as a barcode. An imaging device may comprise of any suitable means such as a CMOS, CCD sensor, a laser scanner etc. The detected barcodes are very often transmitted to a processing unit residing in the computer terminal for further processing and utilization. A typical output of a barcode reader would be a list of items corresponding to the recognized assets; each item in the list may contain the information encoded in the barcode and possibly the location of the barcode in the image.

Other prior art barcode detection systems may include, for example, a laser barcode scanner attached to a mechanical robot that shifts it in front of the assets. The barcode information is extracted by the laser scanner and the barcode location can be provided by the mechanical robot. Assets detection systems are not restricted to barcode detection and can be based on various asset identification algorithms and techniques such as OCR (Optical Character Recognition), Pattern Recognition, RFID and others.

Figure 2:
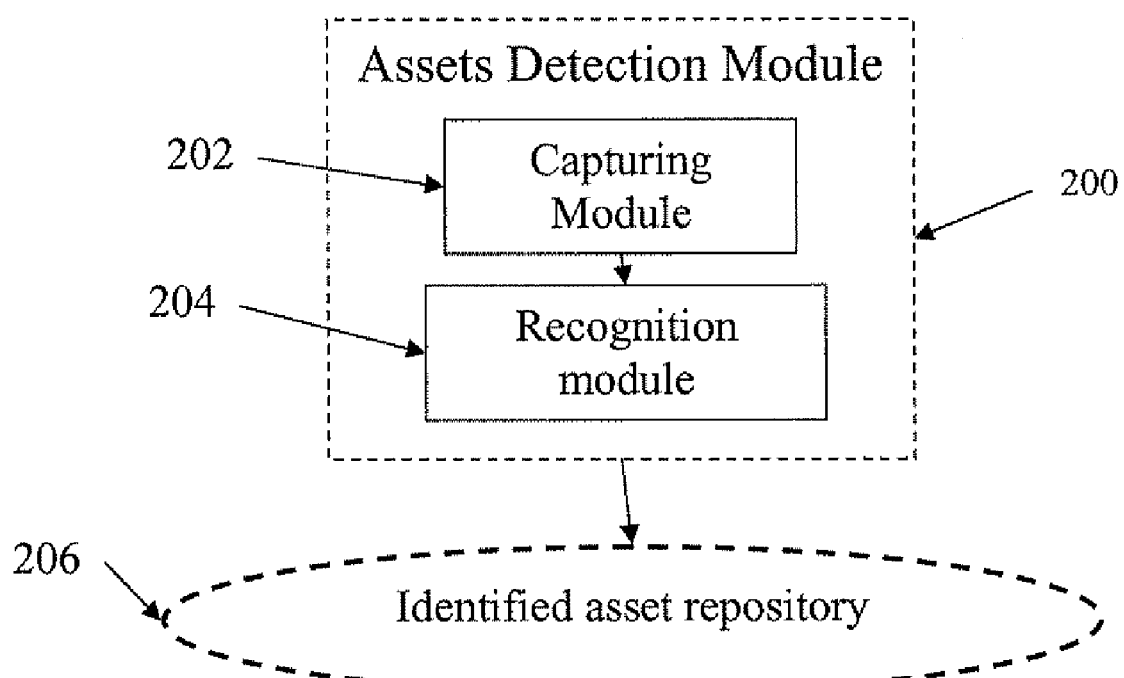
FIG. 2 is a block diagram illustrating a prior art assets detection system.

FIG. 2 is a block diagram illustrating a prior art assets detection system. Asset detection module 200 is typically configured within a barcode reader 102. When activated, the Capturing Module 202 receives the information indicative of the area of inspection. For example, the information can be in the format of images (e.g. captured by a camera), multiple or single one dimensional signal, radio frequency, or any other form. The area of inspection (which may otherwise be called the "inspected area") is an area comprising at least part of a package, which is being captured (or scanned) by the detection system. The Recognition module 204 analyzes the captured information, recognizes the identifiers, decodes the information from the identifiers and detects and identifies the assets. Depending on the type of barcode detection system, the processing may include for example barcode detection and decoding, a pattern recognition algorithm, OCR, radio frequency decoding or any other type of asset identification technique of any type of identifier. According to certain embodiments, the output of the Asset Detection Module 200 is stored in an Identified asset repository 206 that contains decoded information from the barcode identifying each asset, for example, asset type, serial number, weight, source, destination etc, possibly also including information regarding the assets location in the package.

For example, an asset detection system such as a barcode reader as shown in FIG. 1 uses one or more cameras to capture one or more images, which are received by the capturing module 202, and then processed, by the recognition module 204 in order to detect and decode all barcodes within the captured images, and provide a list of the detected assets. The list of assets may be displayed on a displaying means such as a screen linked to the barcode reader via a computer terminal or directly associated with the barcode reader.

Figure 3:
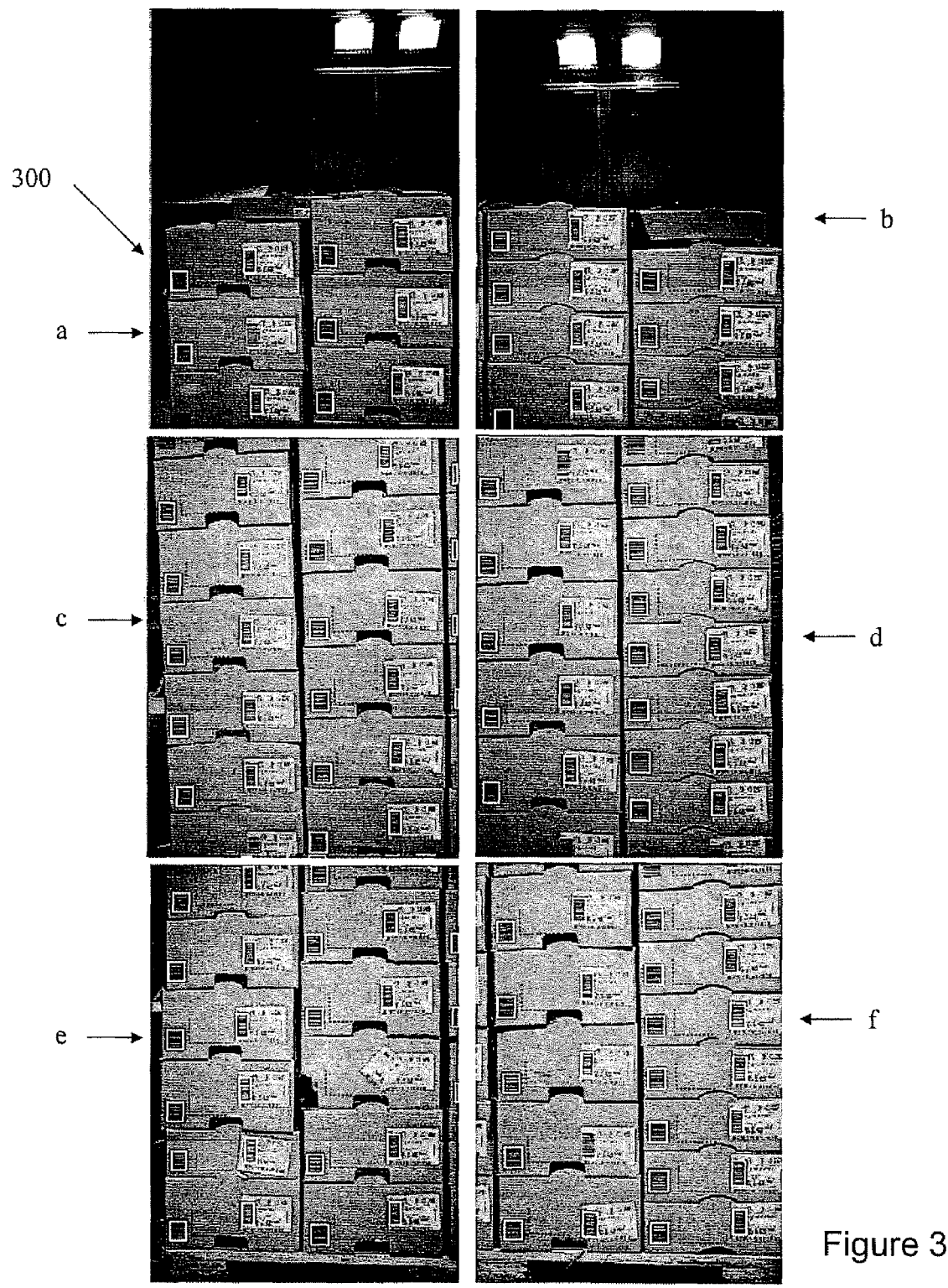
FIG. 3 is an example of images captured by a prior art barcode detection system.

FIG. 3 is an example of images captured by a prior art barcode detection system. In this example the barcode detection system comprises 6 barcode readers, where each barcode reader is capable of reading multiple barcodes and has a different area of inspection. Each rectangle (a, b, c, d, e, f) in FIG. 3 represents the output of one out of the six barcode readers arranged in a 2×3 matrix. Although the embodiment of the present invention is discussed with respect to multiple barcode readers, it should be appreciated that the present invention may utilize other readers' configurations. For example the six images might be obtained from 6 cameras, connected to a single or multiple processors.

As shown in FIG. 3, there is some overlap between the individual areas of inspection (corresponding to each barcode reader) to ensure detection of all barcodes within the entire area of inspection covering the whole package.

The systems described above are capable of detecting assets, however, in cases where they fail to detect one or more assets, either due to algorithm problem, defective or missing barcodes, or other reasons, the system provides no indication that a barcode has been overlooked or is missing. In many logistic scenarios, it is important to receive such information, in order to be able to monitor and correct such errors. Some systems, which are known in the art, may be able to determine if an asset is missing provided that they have additional information with regard to the expected list of assets, however this information is often unavailable. According to one aspect of the present invention, an automatic system that provides both indications of missing or undetected assets, and also information with regard to the type and location of the missing assets is disclosed herein.

FIG. 4 is a block diagram illustrating a high level view of an assets detection system, in accordance with an embodiment of the invention. According to certain embodiments, a barcode detection system, such as a barcode reader is configured with an Assets Detection Module 400, which comprises a Capturing Module 402 and a Recognition Module 404, as described above with reference to FIG. 2. In accordance with an embodiment of the invention the output of the Assets Detection Module may be a list of assets. According to certain embodiments, the list may include not only the information identifying the assets but also spatial information and properties that are indicative of the locations of the assets 206 in the package. According to certain embodiments, information identifying the assets may serve to retrieve the required spatial properties. In accordance with an embodiment of the invention, an Unidentified Assets Locator Module 408 analyzes the lists of identified assets and, based on their position and their spatial properties, detects areas that are suspected as locations of unidentified assets, as described in more detail below. In accordance with an embodiment of the invention, based on the spatial properties of the areas detected by the Unidentified Asset Locator 408 and based on the spatial properties of available asset types, an Unidentified Assets Filler Module 410 is configured to provide a list of assets, which are most likely to be the unidentified assets.

According to one embodiment, the Assets Detection Module 400 and the Unidentified Assets Locator Module 408 are tightly coupled, for example they may be configured in a single unit (e.g. in the barcode reader). According to other embodiments, module 400 and module 408 may be located in different and possibly remote locations, and are linked by some type of a communication network. Alternatively, or additionally, the information from the Assets Detection Module 400 may be stored on any type of a storage device (disk, disk-on-key, etc.) and transferred to module 408 by utilizing the storage device.

FIG. 5 is a block diagram illustrating a detailed view of an assets detection system, in accordance with an embodiment of the invention. It should be noted that the division of system into modules, as shown in FIG. 4 and FIG. 5, is only for ease of understanding and in other embodiments any of the modules may be separated into a plurality of modules or alternatively combined with any other modules. Other embodiments of the invention may include less functionality or more functionality than the functionality provided by the modules illustrated in FIG. 4 and FIG. 5.

According to certain embodiments, an Assets Detection Module 400 comprises a Capturing Module 402 and a Recognition Module 404. As explained above, the Capturing Module may comprise a camera, or a laser scanner or an RFID signal detector or the like. The Recognition Module 404 may comprise a barcode detection device, OCR, Pattern Recognition, RFID signal analyzer or the like. The Capturing Module 402 is configured to obtain information from the inspected area, and the Recognition Module 404 is configured for processing this information and detecting the identifiers, thereby identifying the assets associated with the identifiers within the area of inspection. The Recognition Module is configured to identify the location of the detected identifiers in respect of the area of inspection. The location of each identifier is assumed to be indicative of the location of the asset which is associated with the identifier. The recognition module 404 also decodes the detected identifiers and retrieves the decoded information.

In accordance with an embodiment of the invention the output of the Assets Detection Module 400 is a list of assets which are stored in an identified asset repository 206. According to certain embodiments, the list includes not only the information identifying each of the assets but also spatial information that is indicative of the locations of the assets 206 in respect of the package. The spatial information in accordance with an embodiment of the invention is essential for the further processing which is aimed to identify assets in the package which were not detected by the Asset Detection Module 400 and to determine their location and type as described in detail below.

In accordance with certain embodiments of the invention, an Unidentified Assets Locator Module 408 is configured to determine whether there are one or more empty spaces (or holes) which are located between the identified assets. These holes represent areas within the package which are suspected as assets which were not identified by the Asset Detection Module 400. The Unidentified Asset Locator Module is thus configured to identify these holes, as well as determine their size and location in respect of the package (or the area of inspection).

In accordance with certain embodiments of the invention, Unidentified Assets Locator Module 408 comprises an Assets Assembly Module 510, which is configured to digitally reconstruct the structure of the package, based on the location of the identified assets and their spatial properties. The Assets Assembly Module 510 is composed of an Assets Iterator Module 514 and an Assets Appending Module 516. The Assets Iterator 514 is configured to iterate over the list of assets that were identified by the Assets Detection Module 400, which are stored at the identified asset repository 206, and the Assets Appending Module 516 utilizes, for each asset, information indicative of the location of the asset and other spatial properties of the asset, in order to digitally reconstruct the package. In accordance with certain embodiments of the invention, the output of the Assets Assembly Module 510 is a digital representation 518 of the structure of the identified assets in the package which is representation of the geometric distribution of the assets within the structure of the package in some type of an electronic format. This digital representation, in accordance with certain embodiments of the invention, may be represented in various forms such as vector, a matrix, a tree, an image or the like.

According to certain embodiments, the information regarding the asset type is encoded on the barcode and the Assets Appending Module 416 retrieves the spatial properties of any specific asset type from an Asset Type Database 520, which is a data storage which holds asset types and their corresponding spatial properties. By utilizing a lookup table indexing spatial properties according to asset type, it is possible to determine for example the asset size, the asset perimeter, and the barcode offset from the perimeter of the assets (e.g. the offset of the barcode from the top left corner of the asset). According to certain embodiments, each package of assets may contain a variety of types of assets with different spatial properties. Assets in the same package may have different sizes and the identifier (e.g. barcode) may be located in different locations in respect to the perimeter of the asset.

According to other embodiments, all assets in a package of assets may have the same properties, accordingly all assets have the same size and the identifier (e.g. barcode) is located in the same location in respect to the perimeter of the asset. In such cases, where a single asset type with known spatial properties is being detected, the retrieval of spatial properties, from a database, may be redundant.

The Assets Appending Module 516 is configured to utilize the location of each of the identified barcodes, in respect of the package, and the spatial properties of each of the assets which are associated with the identifiers to reconstruct the digital representation of the package 518.

In accordance with certain embodiments of the invention, a Holes Finder Module 522 analyses the package digital representation 518, and uses geometry considerations and algorithms to find holes in the reconstructed package geometry. In accordance with certain embodiments of the invention, the Holes Finder Module 522 also calculates and obtains different properties of the holes, such as size, boundaries, neighboring assets, etc. Based on part or all of the holes properties, the Holes Finder Module 522 determines whether such holes are suspected as representing unidentified assets, which were not identified by the Assets Detection Module 400. For example, size of hole may be compared to a predefined minimum threshold.

In accordance with certain embodiments of the invention, in cases where a suspected hole is identified, a visual or vocal alarm may be displayed to indicate that an unidentified asset has been detected.

According to certain embodiments, the Unidentified Assets Filler Module 410 is configured to receive information regarding the identified holes and their properties from the Unidentified Asset Locator 408 and attempt to fit one or more assets to the identified hole.

According to a certain embodiment, the Unidentified Asset Module 410 comprises a Holes Filler Module 524, which in turn comprises one or more of the following modules: a Holes Iterator 526, an Asset Recursive Filler Iterator Module 528, an Asset Filling Module 530, a Fill Quality Estimator Module 532. Although the embodiment of the present invention is discussed with respect to assets recursion iterations to fill the hole, it should be appreciated that the present invention may utilize any other algorithm to find an arrangement of assets in the hole. In accordance with certain embodiments of the invention, the Holes Filler Module 524 uses the Hole Iterator Module 526 to iterate over the identified holes. For each hole the Assets Filler Iterator Module 528 calls the Assets Filling Module 530, which in turn attempts to fit a combination of one or more assets into the hole and calculates the remaining space in the hole. Each such combination represents a candidate group (i.e. one or more assets) of assets for being the undetected assets in the hole. In some embodiments the filling of the hole is performed in a recursive manner. The combination of assets may comprise assets of the same type or assets of different types. The asset types and their properties are retrieved from the asset type database 520. These actions are repeated until the remaining hole is too small to fit any of the asset types in the Assets Type Database 520. In each iteration, the Assets Filler Iterator Module 528 continues to try filling assets, per all assets type. The Assets Filling Module 530 provides a plurality of possibilities for filling the hole where each possibility comprises one or more assets which fit a given hole. The suggested assets may be of the same or of different asset types.

In accordance with certain embodiments of the invention, a Fill Quality Estimator 532 calculates the quality of each of the suggested filling combinations, provided by the Filling Module 530 and selects the filling combination with the highest quality. The fill quality estimation may be based on different parameters, for example, in case the hole is not completely filled by the suggested combination, the percent area of the hole that is filled is considered, in case the suggested combination covers an area which is larger than the area of the hole, the percent of the excessive area outside the hole is considered. In addition the similarity between the type of the assets comprising a suggested combination and the type of neighboring assets, may also be considered by the Fill Quality estimator. For each hole, the combination with the highest calculated quality is determined as the missing asset(s) corresponding to the hole.

In accordance with certain embodiments of the invention, in cases where a detected hole is the result of an actual space, which exists between the assets (e.g. the assets assembly to a package was designed to have a hole (i.e. space between assets) or assets in the package are separated by non-assets objects such as a wooden pallet), a virtual hole asset with spatial properties identical to the expected real holes can be used as additional asset type in the Assets Database Module 420. Such a "hole asset" can prevent other wrong assets from filling a real hole by the Holes Filler Module 424 and it can be removed from the list at a later stage. Alternatively or additionally, if the fill quality is below a certain threshold, it may imply that none of the assets can fit in the detected hole. In such a case, the detected hole may represent a true space in between assets in the package. In accordance with certain embodiments, a warning may be issued to indicate this to the system's operator.

In accordance with certain embodiments of the invention, a Lists Merge Module 534 merges the assets list obtained by the Assets Detection Module 400 with the filled assets list obtained by the Hole Filler Module 524 to a Final Identified asset repository 536.

FIG. 6 is a flowchart showing the operations of an assets detection system, in accordance with an embodiment of the invention. This flowchart illustrates an example of an operational scheme of the block diagram described in FIG. 5. Although the embodiment of the present invention is discussed with respect to digital representation in the form of an image, it should be appreciated that the present invention may utilize other forms of digital representation, such as vector, matrix, tree, or the like.

According to certain embodiments, images of the inspected area are captured 600 by one or more capturing devices configured within a barcode reader. According to certain embodiments, the capturing device is associated with a Capturing Module 402 as described above with reference to FIG. 4 and FIG. 5. In accordance with certain embodiments of the invention, wherein the capturing device is a camera, the images are processed and barcodes (within the images) are detected and decoded 602. The operations described with reference to step 602 are preformed by a Recognition Module 404 as described above. Although the embodiment of the present invention is discussed with respect to images and barcode detection, it should be appreciated that the present invention may also utilize with any type of asset detection method and/or system. In accordance with certain embodiments of the invention, one or more barcode readers are used and each of them provides a list of barcodes, including the information encoded in each barcode and the location (e.g. the coordinates) of the barcode in respect of the boundaries of the image. In accordance with certain embodiments of the invention, where more than one barcode reader is utilized, the barcode coordinates are transformed to absolute world coordinates taking into account optical magnification and relative position of the different cameras 604. In accordance with certain embodiments of the invention, the several lists of barcodes that were obtained by the multiple barcode readers are merged to a single list 606. Consider for example the following example: Two cameras, one position on the left and the other on the right of the field of view. Each camera having a resolution of 3000×2200 with optical magnification which results in 2 pixels per millimeter are positioned in landscape mode, one meter horizontally from each other. For example, the field of view of each camera may be 1500×1100 millimeters with an overlap of 500 millimeters between the two cameras. In accordance with certain embodiments of the invention, one may transform the coordinates of the barcode list provided by the left camera to x'=x/2, y'=y/2 which is the offsets in millimeters from the top left point of the full field of view. For the barcode list provided by the right camera x'=500+x/2, y'=y/2 thus providing a single axes coordinates system for both cameras. It should be noted that although the embodiment of the present invention is discussed with respect to units in millimeter, it should be appreciated that the present invention may also be applied with any other units.

In accordance with certain embodiments of the invention, in step 606 duplicated barcodes which were detected by more than one barcode reader, as a result of different barcodes with overlapping filed of view, are removed. In addition, in accordance with certain embodiments of the invention, barcodes that were detected by more than one barcode reader can be used to fine-tune the reader's registration. For example, in the above case the two readers assume to have a horizontal shift of 0.5 meter, however, if a barcode was detected by both readers, one can use the location of the detected barcode as a reference point for calculating the actual shift between the different barcode readers (e.g. 0.47 meters instead of 0.5 meter) and to correct all other barcodes coordinates according to the corrected shift.

In accordance with certain embodiments of the invention, a digital representation of the assets spatial geometry is generated. As mentioned above the digital representation may be in the form of a vector, matrix, tree an image or the like. By way of example only, FIG. 6 is described in connection with digital representation in the form of an image, which is named herein a Virtual World Image (VWI). The VWI is initially generated with dimension (e.g. width and height) that are equal to the dimensions of the inspected area 608. In step 608 all pixels of the image are initialized with a constant specific value (e.g. 255 which refer to white). Step 610 iterates over all the detected barcodes and for each detected barcode the asset type is identified. Different assets in a package may be of different types and the asset type, of each asset, may be identified by decoding the information encoded on the barcode 612. Alternatively, all assets in a package may have the same asset type. According to certain embodiments, the asset type is used to retrieve the spatial properties 614 of the asset. These spatial properties, together with the location of the identifier (e.g. barcode) within the package, enable to draw each of the detected assets in the VWI. Steps 612 to 616 are repeated for each detected asset and thus an image (VWI) is gradually created, the image being the digital representation of the detected assets in the package. According to certain embodiments, asset type spatial properties are retrieved from Asset type database 420. Steps 608 to 616 are performed, in some embodiments, by an asset assembly module 510, which is described above. In accordance with certain embodiments of the invention, a holes search algorithm is executed 618 to find the location and area of all missing assets, (according to some embodiments performed by also as Hole Finder Module 522). In accordance with certain embodiments of the invention, for each hole that was found, a hole filling process 620, checks all possible single or multiple assets combinations 622, 624, 626 that can fill or partially fill the hole. As mentioned above with reference to FIG. 5 a quality check is performed, in step 626, for selecting the best suggested combination of assets for filling a hole. For example, similarity between the assets in the suggested combination and an asset in the vicinity (neighboring asset) of the hole is determined and used to evaluate the quality of each combination. The similarity is important, since in logistic packaging scenarios it is common that identical asset types are grouped together. In accordance with certain embodiments of the invention, the proposed assets with the highest quality for any given hole are appended to the original list of detected barcodes to form a completed list of assets in a package. The hole search algorithm 618 repeats its operations (steps 622 to 628) until all holes in the VWI are processed, and then the hole filling process is terminated. The partial flowchart that includes 622-628 is an example of a hole filling algorithm flowchart that is described also by the partial block diagram that contains blocks 526-532.

It should be appreciated that although the above discussion with reference to FIG. 6 is made in respect to barcode detection, VWI image, recursive algorithm to fill the holes and specific filling quality check, it should be appreciated that the present invention may also be implemented using other combinations of asset detection geometry analysis that provide indication of missing assets and assets filling methods or algorithms. For example, for those who are skilled in the art, various bin packing and knapsack algorithms are families for cutting and packing algorithms that handle the optimization problem of finding a good arrangement of multiple items in larger containment regions. Various exact, heuristic, meta-heuristic and hybrid algorithms have been suggested. Therefore, rather than using image processing to find the optimal arrangement of assets that fill a hole, in accordance with embodiments of the invention, one can use the core method of such bin packing or knapsack algorithms while adapting them to the constrains resulting from the specific filling hole problem as described herein.

Figure 7:
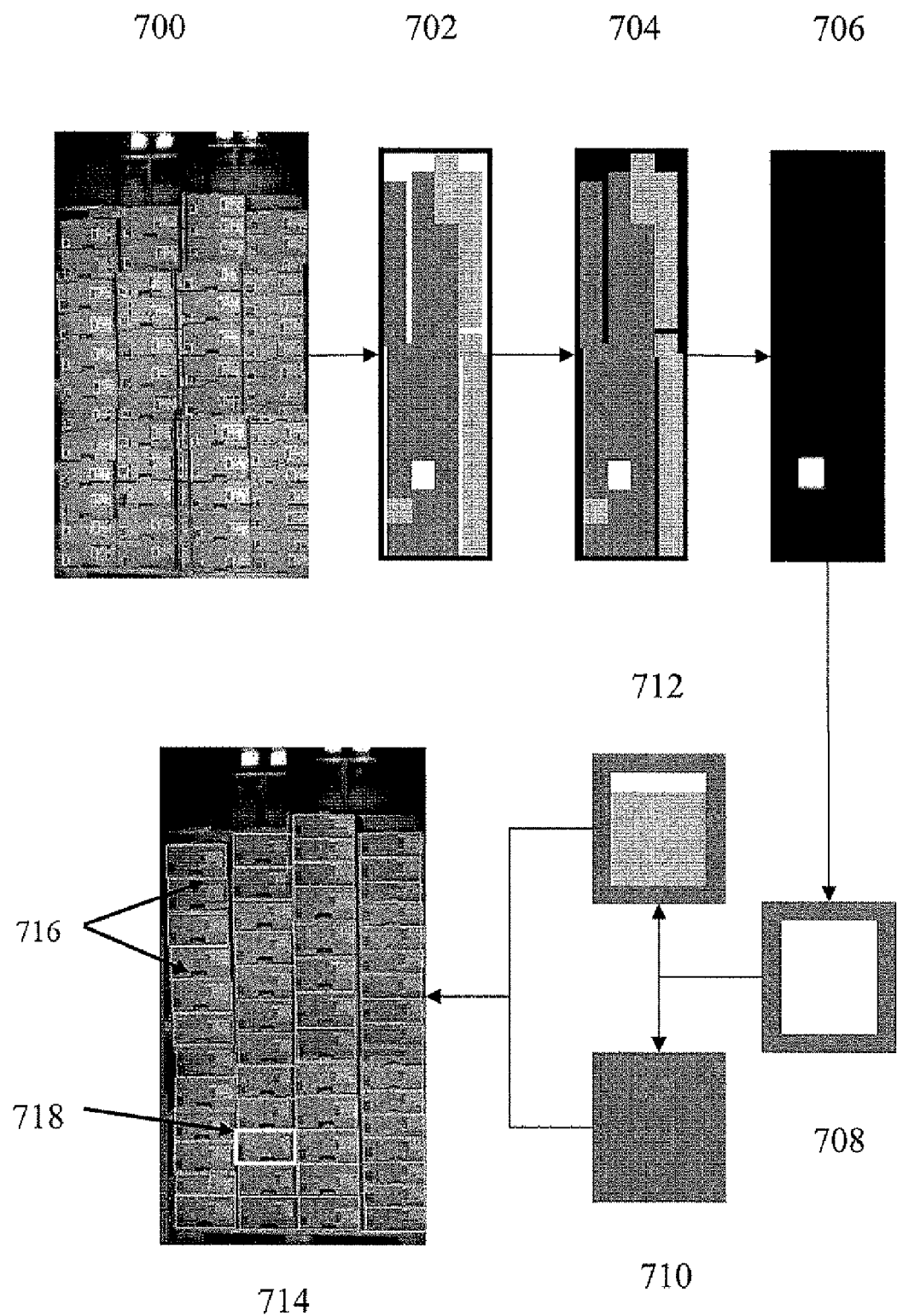

FIG. 7 is an example of detection process results, in accordance with an embodiment of the invention. According to certain embodiments, where multiple barcode readers are used, barcode coordinates per each camera of each reader, are translated to absolute values using camera position offsets, and an optional single image is obtained from the multiple barcode readers 700. As one can see in the example, the same barcode can be decoded by more than one barcode reader due to overlapping fields of view of the capturing device of each barcode reader 716. In accordance with certain embodiments of the invention, as mentioned above, this information can be used to improve the registration of the images and therefore the barcodes' absolute locations. In the example depicted in FIG. 7, one can see that the barcodes on the asset in the second column from left and third row from bottom 718 are missing, thus no indication of this asset is available. As described above in FIG. 6, a VWI is generated and in this example is initialized to value of 255 (white). For each decoded barcode the data is extracted and used to identify the asset type. When the asset type is known one can use the data in respect of its spatial properties and the known barcode location to determine its boundaries coordinates in respect of the package. According to certain embodiments, using the boundaries coordinates, the area of each of the assets in the VWI is filled with a non-white unique color, wherein each unique color is associated with each specific asset type. 702 shows an example of such VWI image after filling all spaces using the information that was retrieved from the decoded barcodes depicted in 700. The white areas in VWI represent areas where no assets were detected and the gray areas represent areas of assets. The gray value indicates the asset type where in this specific example the VWI 702 shows two types of assets, i.e., two different gray values (light gray and dark gray).

The narrow white areas are comprised of narrow strips that can arise due to various types of errors such as small distances between assets, inaccurate asset sizes that had been provided to the algorithm, variation of the asset sizes due to variation of the pallet distance from the camera, etc. In addition, there are the top area and side areas that arise due to the fact that the full package may not be an exact rectangle and central area indicating an undetected asset. In accordance with certain embodiments of the invention, various methods can be applied to handle the top, side and narrow areas. The narrow area (e.g. identified as smaller than a given minimum size) can be algorithmically removed, or can be ignored since no asset can be filled in it. The top and side areas can be removed, ignored or processed for filling depending on the package structure. In image 704, all the top, side and narrow areas were removed by setting them to 0 (dark value). The white area and the gray areas indicate holes and assets respectively as described above. In accordance with certain embodiments of the invention, image 704 is processed, (e.g. by utilizing a blob algorithm) and the assets holes are identified by locating the white (255) areas. An example of the result of such processing of the VWI 704 is shown in image 706, where only one hole was found. In image 708 a close-up of the detected hole is shown. It can be seen that all the surrounding neighbors are of the same type, since the area surrounding the hole is colored in the same unique gray color (see image 704). There are two types of assets filling that are shown in 710 and 712. It can be easily seen, that the asset shown in 710 perfectly matches the hole and its type is identical to its neighboring assets of the hole, while the asset shown in 712 doesn't fully match the hole and its color is different than the color of the neighboring assets (i.e. a different shade of gray). In accordance with certain embodiments of the invention, a quality comparison is performed and selects 710 as the best match. In accordance with certain embodiments of the invention, the assets that were selected as best matches of the holes are added to the original detected list. In accordance with certain embodiments of the invention, the final results 714 comprise detected assets (indicated by a light gray rectangle) 716 and filled assets (shown in bold white) 718.

Although embodiments of the present invention are described herein in respect of barcodes detected in captured images, it should be appreciated that this is an example only and the present invention may also be implemented by the utilization of other detections methods, such as lasers, pattern recognition, OCR, RFID etc.

Although embodiments of the present invention are described herein in respect to VWI as a sample of digital representation in the form of an image, and the hole search and filling is done by image processing algorithms, it should be appreciated that this is an example only and the present invention may also be implemented by the utilization of other systems and methods such as such as knapsack or bin packing combined, or any other algorithm over digital representation of forms such as vector, matrix, tree and the like.

Although embodiments of the present invention are described herein in respect of indirect retrieval of assets spatial properties by means of using the barcode encoded data to identify the asset type, it should be appreciated that this is one example only and the present invention may also be implemented by utilizing other spatial properties retrieval methods. For example, in accordance with certain embodiments of the invention, one can use pattern recognition or OCR or any other detection method that will provide not only indication of the asset location but also indication of the assets spatial properties such as size, angle or projection. For example, in cases where assets may have a colored line indicating their boundaries and the Assets Detection Module 400 executes an algorithm to find these lines in order to identify the assets, it can provide not only the location of the asset but also asset spatial properties, i.e., the asset size. In accordance with other embodiments of the invention, the locations of the detected barcodes can be used to calculate spatial properties by means of calculating the average, mean, maximum, and/or minimum of spatial properties such as distances, horizontal distances, vertical distances and/or angles between detected objects. Such statistical spatial properties can be used to find exceptional spatial properties and thus missing assets. For example, in a case where homogenous assets are stacked, each asset has a size of 0.3×0.3 meters and a barcode located in its central area with tolerance of 0.1×0.1 meters. In such a case, even when the system is not provided with any information regarding the asset size, the system can obtain all barcode locations, calculate the distance between adjacent barcode locations and use statistical analysis to find spatial properties, e.g., typical distance between adjacent assets. The system then may use this spatial information to find holes, e.g., by identifying neighboring assets for which the indicated distance between their barcodes is equal or near the expected distance between two or more assets. In cases where non-homogenous assets are stacked, another statistical analysis may be executed.

Although the embodiment of the present invention is discussed with respect to multiple barcode readers, it should be appreciated that the present invention may also be implemented with a single barcode reader.

The present invention has been described with a certain degree of particularity, but those versed in the art will readily appreciate that various alterations and modifications may be carried out, without departing from the scope of the following claims:

The invention claimed is:

1. A method for automatic recognition of one or more undetected assets from a plurality of assets, said plurality of assets forming a package and wherein one or more of said plurality of assets is associated with at least one identifier, the method comprises:
    performing the following with a processor:
    (a) obtaining information indicative of an area of inspection, said area of inspection representing at least a part of said package;
    (b) detecting at least one identifier and determining a position of said at least one identifier in respect of said area of inspection; said position is indicative of a position of an asset being associated with said at least one identifier;
    (c) obtaining spatial properties of said asset;
    (d) obtaining a digital representation of said area of inspection, based on said position of said at least one identifier and said spatial properties of said asset being associated with said identifier;
    (e) detecting one or more holes in said digital representation of said area of inspection, each of said one or more holes being suspected as an area representing one or more undetected assets;

(f) determining spatial properties of each of said one or more holes; and (g) comparing said spatial properties of each of said one or more holes to spatial properties of one or more asset types, and selecting a combination of one or more assets, from said one or more asset types, which fit in each of said one or more holes, thereby identifying said one or more undetected assets.

2. The method of claim 1, wherein said obtaining spatial properties of said asset in step (c) comprises:
   I. decoding said at least one identifier and obtaining an asset type of said asset from said identifier;
   II. searching said asset type in a data storage; and
   III. retrieving from said data storage said spatial properties of said asset type.

3. The method of claim 1, wherein said obtaining spatial properties of said asset in step (c) comprises: calculating assets spatial properties based on the location of detected identifiers.

4. The method of claim 1 wherein said spatial properties of said asset include at least one of the following:
   I. asset size;
   II. asset perimeter;
   III. offset of identifier from asset perimeter; and
   IV. distance between identifiers.

5. The method of claim 1 wherein said hole being a space within said package where no assets are detected.

6. The method of claim 1 wherein said selecting a combination of one or more assets, from said one or more asset types in step (g) farther comprises:
   I. constructing one or more combinations of one or more assets; each of said one or more combinations representing a group of candidate assets for being undetected assets in said hole;
   II. determining the quality of each of said one or more combinations; and
   III. selecting the combination with highest quality from among said one or more combinations.

7. The method of claim 6 wherein said determining of said quality is based on at least one of the following: a remaining empty space in said hole after it is filled with a combination; an excessive space in said package covered by a combination; and a similarity between asset types of asset in each of said combination and neighboring assets in the package.

8. The method of claim 1 further comprising displaying said plurality of assets from said package, said plurality of assets including said unidentified assets.

9. The method of claim 1 wherein step (a) is performed by a barcode reader and step (a) is preceded by a step comprising: capturing one or more images displaying said package.

10. The method of claim 1 wherein said at least one identifier is from a group consisting of:
    I. barcode;
    II. OCR;
    III. Pattern; and
    IV. RFID tag.

11. The method of claim 1 wherein said digital representation is in the form of at least one of the following:
    I. image;
    II. vector; and
    III. tree.

12. A method for automatic recognition of one or more undetected assets from a plurality of assets, said plurality of assets forming a package and wherein one or more of said plurality of assets is associated with at least one identifier, the method comprises:

performing the following with a processor:
(a) obtaining a digital representation of an area of inspection, said area of inspection representing at least part of said package; wherein said digital representation is generated based on a position of said at least one identifier and on one or more spatial properties of said one or more assets;
(b) detecting one or more holes in said digital representation of said area of inspection, each of said one or more holes being suspected as an area representing one or more undetected assets;
(c) determining spatial properties of each of said one or more holes; and
(d) comparing said spatial properties of each of said one or more holes to spatial properties of one or more asset types, and selecting a combination of one or more assets, from said one or more asset types, which fit in each of said one or more holes, thereby identifying said one or more undetected assets.

13. A system for automatic recognition of one or more unidentified assets from a plurality of assets, said plurality of assets forming a package and at least one of said plurality of assets is associated with at least one identifier, the system comprising:
    at least one detection device;
    an asset detection module;
    an unidentified asset locater; and
    an unidentified asset filler, wherein
    said at least one detection device is configured for obtaining information indicative of an area of inspection, said area of inspection representing at least a portion of said package;
    said asset detection module is associated with said at least one detection device and is configured for detecting at least one identifier within said area of inspection and determining a position of said at least one identifier in respect of said area of inspection, wherein said position is indicative of a position of an asset being associated with said at least one identifier;
    said unidentified asset locater is configured to perform at least the following:
        obtain spatial properties of each of said assets;
        obtain a digital representation of said area of inspection, based on said position of said at least one identifier and said spatial properties of said asset being associated with said at least one identifier; and
        detect one or more holes in said digital representation of said area of inspection, each of said one or more holes being suspected as an area representing one or more undetected assets; and
    said unidentified asset filler is configured to determine the spatial properties of each of said one or more holes, and compare said spatial properties of said one or more holes to spatial properties of one or more asset types, and select a combination of one or more assets, from said one or more asset types, which fit in each of said one or more holes, thereby identifying said one or more undetected assets.

14. The system of claim 13 further comprising a data storage for storing one or more asset types and their corresponding spatial properties, and wherein said unidentified asset locater is configured to obtain said spatial properties of said asset by:
    decoding said at least one identifier and obtaining an asset type of said asset associated with said at least one identifier; and retrieving from said data storage said spatial properties of said asset type.

15. The system of claim 13 further comprising a display configured for displaying data corresponding to said at least one identifier.

16. The display of claim 15 further configured for displaying said digital representation.

17. The system of claim 15 further comprising a display configured for displaying said information corresponding to said undetected assets.

18. The system of claim 15 wherein said spatial properties of said asset include at least one of the following:
I. asset size;
II. asset perimeter;
III. offset of identifier from asset perimeter; and
IV. distance between identifiers.

19. The system of claim 13 wherein said unidentified asset filler is further configured to:
I. construct one or more combinations of one or more assets for each hole of said one or more holes, each of said one or more combinations representing a group of candidate assets for being undetected assets in a hole from said one or more holes;
II. determine a quality of each of said one or more combinations; and
III. select the combination with highest quality from among said one or more combinations.

20. The system of claim 19 further comprising a data storage for storing one or more asset types and their corresponding spatial properties, and wherein said unidentified asset filler is configured to retrieve from said data storage spatial properties of different asset types for constructing said one or more combinations of assets.

21. The system of claim 13 wherein said at least one identifier is from a group consisting of:
I. barcode;
II. OCR;
III. pattern; and
IV. RFID tag.

22. The system of claim 13 wherein said digital representation is in the form of at least one of the following:
I. image;
II. vector; and
III. tree.

* * * * *